United States Patent
Nomura et al.

(10) Patent No.: US 9,679,150 B2
(45) Date of Patent: Jun. 13, 2017

(54) DOCUMENT MANAGING APPARATUS AND DOCUMENT MANAGING METHOD

(71) Applicant: KYOCERA Document Solutions Inc., Osaka (JP)

(72) Inventors: Takashi Nomura, Osaka (JP); Daisuke Yoshida, Osaka (JP); Chika Tsuji, Osaka (JP); Takeshi Nakamura, Osaka (JP); Yuichi Obayashi, Osaka (JP); Jumpei Takagi, Osaka (JP); Katsuhiro Minoru, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 14/721,324

(22) Filed: May 26, 2015

(65) Prior Publication Data
US 2015/0339487 A1    Nov. 26, 2015

(30) Foreign Application Priority Data
May 26, 2014 (JP) .................................. 2014-108116

(51) Int. Cl.
*G06F 21/62* (2013.01)
(52) U.S. Cl.
CPC ....... *G06F 21/62* (2013.01); *Y10S 707/99932* (2013.01)
(58) Field of Classification Search
CPC ............... G06F 21/62; G06F 17/20011; Y10S 707/99932
See application file for complete search history.

(56) References Cited

U.S. PATENT DOCUMENTS 5,633,932 A * 5/1997 Davis ....................... B41J 29/54
340/5.86
7,383,568 B1 * 6/2008 Newstadt ............ H04L 63/0263
726/1
(Continued)

FOREIGN PATENT DOCUMENTS

JP    2006-065837 A    3/2006
JP    2007-249864 A    9/2007
(Continued)

*Primary Examiner* — Matthew Smithers
*Assistant Examiner* — Nelson Giddins
(74) *Attorney, Agent, or Firm* — Hawaii Patent Services; Nathaniel K. Fedde; Kenton N. Fedde (57) ABSTRACT

Provided is a document managing apparatus that can eliminate the complexity of operation related to designation of confidential information, and yet reliably prevents leakage of confidential information. First, a receiving circuit receives target files from a client terminal. Therefore, a file managing circuit manages, of the received target files, a file that is designated as confidential, having been subjected to output restriction, as a confidential designated file. In addition, the file managing circuit manages a file that is not designated as confidential, as a user file. In addition, the file analyzing circuit compares the user file with the confidential designated file. If the content of the user file is similar to the content of the confidential designated file at a rate equal to or higher than a certain value (for example, 80%), the file analyzing circuit applies output restriction to the user file.

6 Claims, 4 Drawing Sheets

(56) References Cited

U.S. PATENT DOCUMENTS

| | | | |
|---|---|---|---|
| 7,698,298 B2* | 4/2010 | Ciaramitaro | G06Q 10/10 707/999.107 |
| 7,756,843 B1* | 7/2010 | Palmer | G06F 17/30864 707/694 |
| 8,234,258 B2* | 7/2012 | Palmer | G06F 17/30864 707/694 |
| 8,495,751 B2* | 7/2013 | Joyce | G06F 21/00 709/203 |
| 8,782,805 B2* | 7/2014 | Zhang | G06F 17/30616 726/30 |
| 8,844,059 B1* | 9/2014 | Manmohan | G06F 21/554 726/26 |
| 2004/0199555 A1* | 10/2004 | Krachman | G06Q 50/16 |
| 2005/0004950 A1* | 1/2005 | Ciaramitaro | G06Q 10/10 |
| 2005/0004951 A1* | 1/2005 | Ciaramitaro | G06F 17/30011 |
| 2005/0179929 A1* | 8/2005 | Jain | G06F 21/608 358/1.14 |
| 2006/0005247 A1 | 1/2006 | Zhang et al. | |
| 2008/0060080 A1* | 3/2008 | Lim | H04L 63/20 726/26 |
| 2008/0079990 A1* | 4/2008 | Iida | G06F 21/608 358/1.15 |
| 2008/0235225 A1* | 9/2008 | Michele | G06F 21/10 |
| 2009/0147292 A1* | 6/2009 | Shimura | H04N 1/00875 358/1.14 |
| 2009/0313706 A1* | 12/2009 | Zhang | G06F 17/30616 726/30 |
| 2010/0011000 A1* | 1/2010 | Chakra | G06F 19/322 707/E17.005 |
| 2010/0097628 A1* | 4/2010 | Masuda | G06F 3/1222 358/1.14 |
| 2010/0097662 A1* | 4/2010 | Churilla | H04N 1/00795 358/448 |
| 2010/0223671 A1* | 9/2010 | Tsuda | G06F 21/554 726/26 |
| 2010/0315672 A1* | 12/2010 | Suzuki | G06F 3/126 358/1.15 |
| 2011/0162050 A1* | 6/2011 | Krajna | H04L 63/166 726/4 |
| 2013/0057903 A1* | 3/2013 | Yamazaki | G06F 3/1204 358/1.15 |
| 2013/0227043 A1* | 8/2013 | Murakami | H04L 51/063 709/206 |
| 2014/0047551 A1* | 2/2014 | Nagasundaram | G06F 21/60 726/26 |
| 2014/0280061 A1* | 9/2014 | Elkhou | G06F 17/30011 707/722 |
| 2016/0048587 A1* | 2/2016 | Scholtes | G06F 17/30705 706/11 |

FOREIGN PATENT DOCUMENTS

| | | |
|---|---|---|
| JP | 2008-225631 A | 9/2008 |
| JP | 2009-282611 A | 12/2009 |

\* cited by examiner

FIG.3

Managed Information Table

| (a) Management No. | (b) File name | (c) Date of registration | (d) Department information | (e) Confidential designated word | (f) Disclosure | (g) Output restriction | (h) Confidential designation |
|---|---|---|---|---|---|---|---|
| 000001 | ***** | ***** | Accounting | Numerical value | Undisclosed | Applied | Effected |
| 000002 | ***** | ***** | Development | Part name | Disclosed | Applied | Effected |
| 000003 | ***** | ***** | Sales | Company name | Disclosed | Applied | Effected |
| 000004 | ***** | ***** | Personnel | Person name | Undisclosed | Applied | Effected |
| 000005 | ***** | ***** | Planning | Commodity name | Undisclosed | Applied | Effected |
| 000006 | ***** | ***** | Accounting | For internal use only | Undisclosed | Applied | Not effected |
| 000007 | ***** | ***** | Development | Secret | Undisclosed | Applied | Not effected |
| 000008 | ***** | ***** | Sales | | Disclosed | Not applied | Not effected |
| 000009 | ***** | ***** | Personnel | | Disclosed | Not applied | Not effected |
| 000010 | ***** | ***** | Planning | | Disclosed | Not applied | Not effected |
| ... | ... | ... | ... | ... | ... | ... | ... |

FIG.4

DOCUMENT MANAGING APPARATUS AND DOCUMENT MANAGING METHOD

INCORPORATION BY REFERENCE

This application is based on and claims the benefit of priority from Japanese Patent Application No. 2014-108116 filed on May 26, 2014, the contents of which are hereby incorporated by reference.

BACKGROUND

The present disclosure relates to a document managing apparatus and a document managing method that are suitable for preventing leakage of any pieces of confidential information that are kept in a document managing system (DMS).

Generally, in companies, and the like, various files, such as various documents, may be registered in a file server as a document managing system (DMS) that is connected to a network. The various files, such as documents, that are registered in the file server can be browsed by a client terminal that is connected to the network. By downloading them with an image formation apparatus that is connected to the network, they can also be printed. The image formation apparatus is, for example, an MFP (Multifunctional Peripheral), which is a composite peripheral equipped with a plurality of functions, such as a printer function, a FAX function, and a scanner function, a printer, or the like.

By registering various files, such as documents, in such a file server as a document managing system (DMS), the various files, such as documents, can be easily retrieved. In addition to this, the various files can be easily distributed. This means that a high degree of convenience for effectively utilizing the various files, such as documents, is obtained.

By the way, the various files, such as documents, that are managed by the file server as a document managing system (DMS), contains a large quantity of confidential information. Such a piece of confidential information is required to be strictly managed from the viewpoint of leakage prevention.

As a typical technique for managing such a piece of confidential information, an information processing apparatus has been proposed which, for each user, registers a forbidden word to the registration destination of a document, such as a folder. With this information processing apparatus, in registering the document, the access authority of the user is set to the document on the comparison of the Forbidden word with the content of the document extracted by performing OCR processing.

SUMMARY

A document managing apparatus according to an embodiment of the present disclosure features that it includes a receiving circuit, a file managing circuit, and a file analyzing circuit. The receiving circuit receives target files from a client terminal. The file managing circuit manages, of the received target files, a file that is designated as confidential with output restriction, as a confidential designated file, and a file that is not designated as confidential, as a user file. The file analyzing circuit compares the user file with the confidential designated file. Upon the content of the user file is similar to the content of the confidential designated file at a rate equal to or higher than a certain value, the file analyzing circuit applies output restriction to the user file.

A document managing method according to an embodiment of the present disclosure is a document managing method, being executed with a computer, for controlling the document managing apparatus. The document managing method includes (i) receiving target files from a client terminal through a receiving circuit, (ii) through a file managing circuit, managing, of the received target files, a file that is designated as confidential, having been subjected to output restriction, as a confidential designated file, and a file that is not designated as confidential, as a user file, (iii) through a file analyzing circuit, comparing the user file with the confidential designated file, and (iv) upon the content of the user file is similar to the content of the confidential designated file at a rate equal to or higher than a certain value, applying output restriction to the user file through the file analyzing circuit.

DETAILED DESCRIPTION

Hereinbelow, an embodiment of a document managing apparatus of the present disclosure will be explained with reference to FIG. 1 to FIG. 4. In the following explanation, an example of document managing apparatus is a file server.

Figure 1:
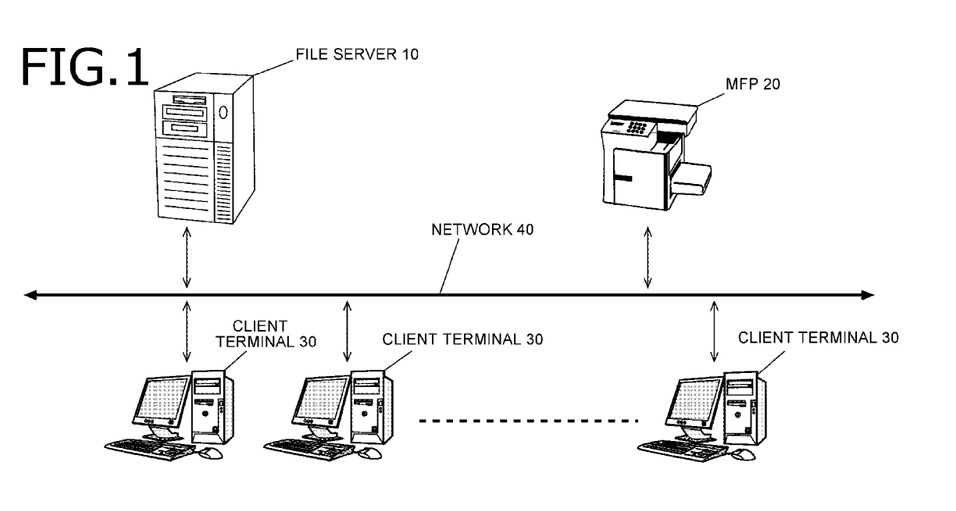
FIG. 1 shows a system configuration of an embodiment of a document managing apparatus of the present disclosure.

First, a file server 10 is a document managing apparatus. As shown in FIG. 1, the file server 10 is connected to a network 40. As the network 40, a line network can be used. In addition, to the network 40, an MFP (Multifunction Peripheral) 20 and a client terminal 30 are connected, for example.

From the client terminal 30, various files, such as documents, are registered in the file server 10. Then, the various files are kept by the file server 10. The various files also include a file in such a form as a memorandum. The various files that are registered in the file server 10 are downloaded as target files for printing through an operation on, for example, a touch panel of the MFP 20. Thereby, they can be printed. Being not limited to the operation on the touch panel of the MFP 20, the same printing request can be made with a mobile terminal, such as a smart phone or a tablet. However, of the various files that are registered in the file server 10, those to which output restriction is applied cannot be printed or browsed as described later.

In the present embodiment, the aspect of output of the target file is assumed mainly to be printing for explanation, however, the aspect of output may be displaying or transmission.

Figure 2:
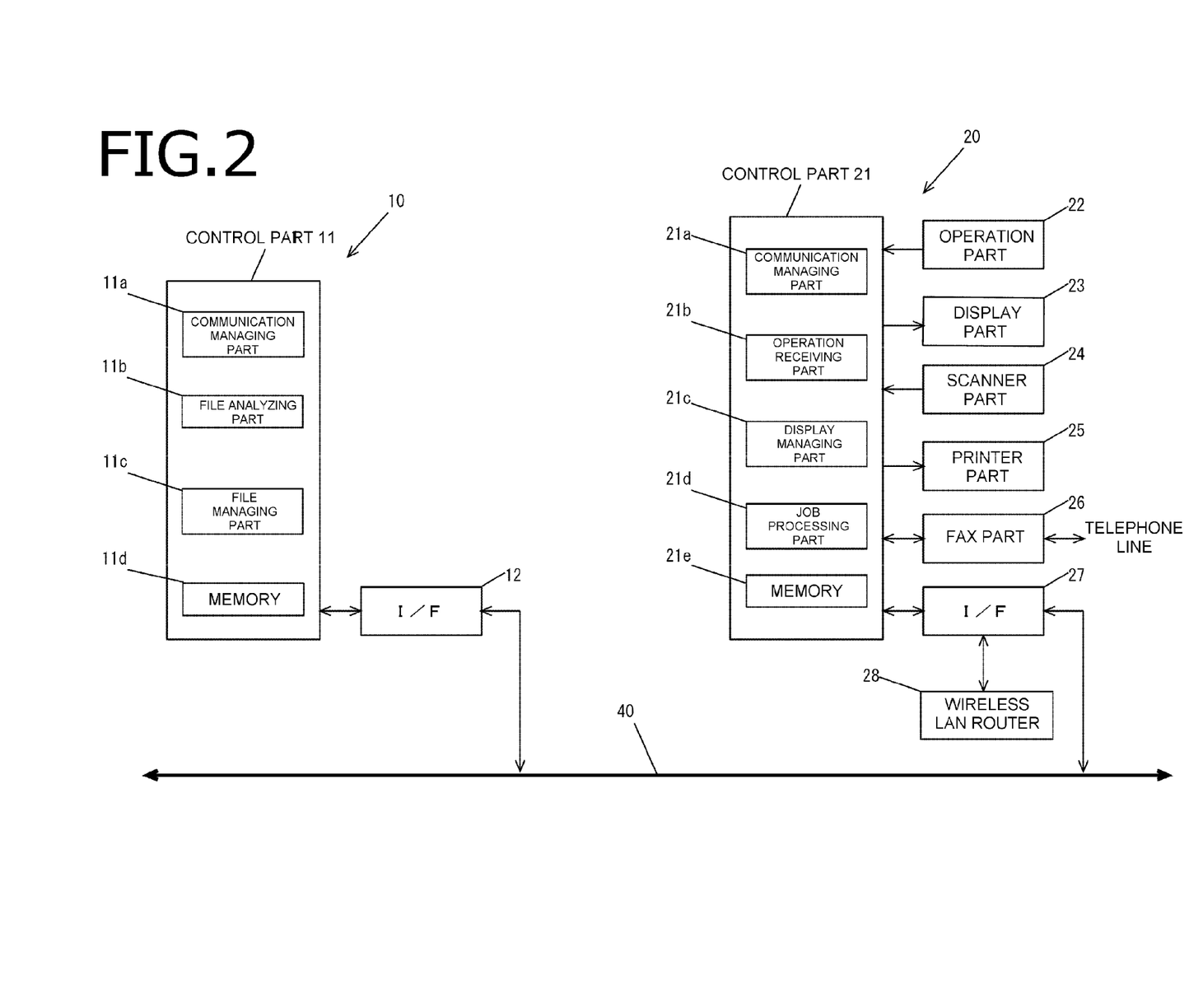
FIG. 2 shows a configuration of a main part of the file server and that of the MFP in FIG. 1.

Next, with reference to FIG. 2, the configuration of a main part of the file server 10 and that of MFP 20 will be explained. First, the file server 10 is provided with a control part 11 and an I/F (interface) 12. The control part 11 is a circuit for controlling the entire operation of the file server 10 based on a program in a recording medium. The control part 11 includes a communication managing part 11a, a file analyzing part 11b, a file managing part 11c, and a memory 11d.

The communication managing part 11a is a circuit for receiving a target file from the client terminal 30 through the I/F 12. The target file that has been received is passed to the file analyzing part 11b. When the MFP 20 makes a request for downloading a target file, the communication managing part 11a transmits the specified target file. However, as described later, if a specified user file of the target files is subjected to output restriction, a piece of output restriction information is outputted. The output restriction information indicates that output restriction has been applied. Here, the output restriction is not limited to printing restriction, and includes restriction of displaying on a display for browsing.

The file analyzing part 11b is a circuit for referencing a later described managed information table that is given in FIG. 3. The file analyzing part 11b analyzes whether or not a file that is not designated as confidential (hereinafter to be referred to as a user file) of the target files that have been registered by the client terminal 30 is a piece of confidential information. If it is a piece of confidential information, the file analyzing part 11b applies output restriction thereto. The file analyzing part 11b discriminates whether or not it is a piece of confidential information based on a comparison with a later described file, such as a document, given in FIG. 3, that has been designated as confidential (hereinafter, to be referred to as a confidential designated file). The confidential designated file includes a number of words that are to be confidential. Then, the file analyzing part 11b discriminates whether or not the content of the user file that has been registered is similar to the content of the confidential designated file that has been designated as confidential at a rate equal to or higher than a certain value. The certain value is a value of similarity, and is, for example, 80%. Based on this value, the file analyzing part 11b can determine whether or not it is a piece of confidential information.

In this case, based on a comparison with the confidential designated file, if the content of the user file has a similarity of, for example, 80% or higher, output restriction is applied to the user file. Contrarily to this, if the content of the user file has a similarity of, for example, 80% or less, output restriction will not be applied to the user file. The certain value mentioned here is not limited to 80%, and may be 90%, 70%, 60%, or the like. In addition, the certain value may be appropriately set and altered by a manager who manages the file server 10.

As described later, upon the user registering a target file in the file server 10, if the user has selected output restriction being to be applied on the screen for selecting either output restriction being to be applied or not to be applied, the target file is subjected to output restriction as a confidential designated file. A target file with which a confidential designated word of either one or both of "for internal use only" and "secret" is attached to, for example, the header region of the target file is also subjected to output restriction as a confidential designated file. Thus, analysis of whether or not it is a piece of confidential information will not be performed by the file analyzing part 11b.

The file managing part 11c is a circuit for managing a target file that has been registered by the client terminal 30, as a piece of managed information in a later described managed information table given in FIG. 3. The detail of management that is performed by the file managing part 11c will be described later.

On the other hand, the MFP 20 has a control part 21, an operation part 22, a display part 23, a scanner part 24, a printer part 25, a FAX part 26, and an I/F (interface) 27. The control part 21 is a circuit for controlling the entire operation of the MFP 20 based on a program in a recording medium (not shown). The control part 21 is provided with a communication managing part 21a, an operation receiving part 21b, a display managing part 21c, a job processing part 21d, and a memory 21e.

The communication managing part 21a is a circuit that receives a target file from the file server 10 through the I/F 27. The target file that has been received is passed to the job processing part 21d. In addition, the communication managing part 21a receives a printing request or a piece of position information from a mobile terminal through a wireless LAN (local area network) router 28 that is connected to the I/F 27.

The operation receiving part 21b is a circuit that receives an operation by the operation part 22, or the like, to specify a target file for printing, or the like.

The display managing part 21c is a circuit that, if output restriction is applied to a target file that has been received by the operation receiving part 21b, causes the display part 23 to display the content indicating that output restriction is applied thereto. If the target file is a user file, the display managing part 21c confirms whether or not the user file is subjected to output restriction based on the above-mentioned output restriction information from the communication managing part 11a. In addition, if the target file is a confidential designated file, the display managing part 21c determines that the target file is subjected to output restriction.

The job processing part 21d is a circuit that performs image processing (rasterization) on a target file that has been downloaded from the file server 10. In the memory 21e, target files, and the like, that have been downloaded from the file server 10 are stored.

The operation part 22 is a circuit that is operated in making such an operation as specifying a target file that is registered in the file server 10. The operation part 22 is constituted by, for example, a touch panel. In making such an operation as printing request for the MFP 10, log-in processing is performed. This is for holding the use authority of the user. The log-in processing is performed through the operation part 22, or by an access from a mobile terminal.

The display part 23 is a circuit that displays the specification of a target file to be printed, a message for guiding log-in, or the like, a list of target files that can be printed by the user, and the like. In addition, as described above, if a target file that has been received by the operation receiving part 21b is subjected to output restriction, the display part 23 displays the content indicating that output restriction is applied thereto.

The scanner part 24 is a circuit that inputs the image data of a document that is read by an image sensor to the control part 21. In other words, the scanner part 24 converts image signals from the image sensor for the document into digital image data for sequentially inputting it to the control part 21.

The printer part 25 is a circuit that prints an image on a paper based on the image data that is outputted from the control part 21. In other words, the printer part 25 forms an electrostatic latent image on the photosensitive drum with laser light that has been modulated based on the rasterized image data that is outputted from the control part 21. Then, toner is supplied to form a toner image based on the electrostatic latent image. This toner image is transferred onto the paper.

The FAX part 26 is a circuit that transmits image data outputted from the control part 21 to a facsimile as an opposite-side device through the telephone line. In addition, the FAX part 26 receives image data from the facsimile as the opposite-side device to input it to the control part 21. In other words, the FAX part 26 controls the connection with the telephone line with an NCU (Network Control Unit) (not shown). In addition, the FAX part 26 compresses and modulates the image data outputted from the control part 21 to transmit it to the facsimile as the opposite-side device.

In addition, the FAX part 26 demodulates and expands the image data from the facsimile as the opposite-side device to input it to the control part 21, while being connected to the telephone line by the NCU. The I/F 27 is connected to, for example, the wireless LAN router 28 or a LAN. The I/F 27 allows data transmission and reception among the file server 10, the client terminal 30, and a mobile terminal.

In a job using the copying function, the image data is inputted from the scanner part 24 to the memory 21e. In addition, the image data is outputted from the memory 21e to the printer part 25. In a job using the print function, the image data that has been subjected to rasterization by the job processing part 21d is outputted to the printer part 25. In a job using the scanner function, the image data is inputted from the scanner part 24 to the memory 21e. In addition, the image data is outputted from the memory 21e to the I/F 27.

In a job using the fax transmission function, the image data is inputted from the scanner part 24 (or the I/F 27) to the memory 21e. In addition, the image data is outputted from the memory 21e to the FAX part 26. In a job using the fax receiving function, the image data is inputted from the FAX part 26 to the memory 21e. In addition, the image data is outputted from the memory 21e to the printer part 25.

If a target file that is registered in the file server 10 is to be printed by the MFP 20, log-in processing is performed to confirm the use authority of the user from the operation part 22, a mobile terminal, or the like. Then, the piece of user authentication information is transmitted to the file server 10 through the LAN.

The file server 10 performs user authentication. Then, a list of target files that can be printed by the user is acquired by the MFP 20, being displayed on the display part 23. At this time, if any one of the files in the list of target files is subjected to output restriction, the above-mentioned display managing part 21c displays the content indicating that output restriction is applied thereto.

Next, with reference to FIG. 3, one example of managed information table that is managed by the file server 10 will be explained. First, the management No. that is given in the column (a) in FIG. 3 is the number for managing a target file that has been registered by the client terminal 30. In an example in FIG. 3, ten target files are managed. Of these ten, the confidential designated files correspond to the management Nos. 000001 to 000005. The user files correspond to the management Nos. 000006 to 000010. The file name that is given in the column (b) in FIG. 3 is a character string attached to the target file that is registered by the client terminal 30. The date of registration that is given in the column (c) in FIG. 3 is the date on which the target file was registered by the client terminal 30.

Figure 3:
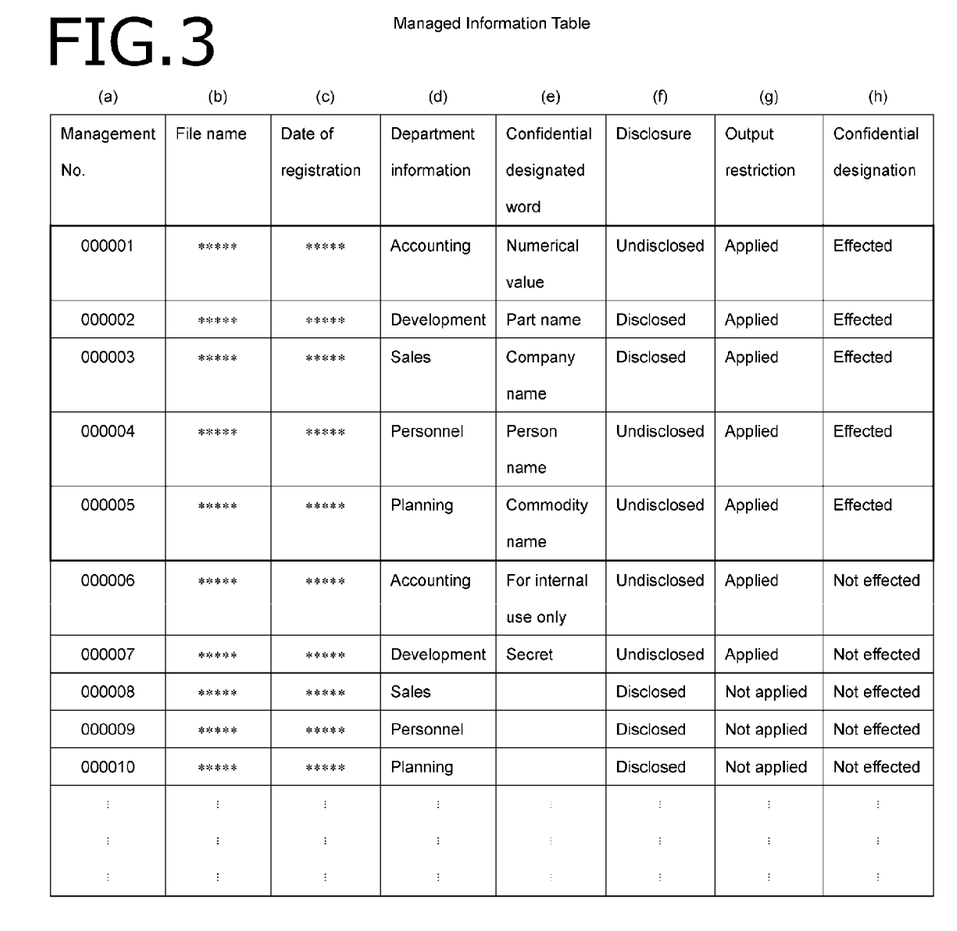
FIG. 3 gives an example of managed information table that is managed by the file server in FIG. 1.

The department information that is given in the column (d) in FIG. 3 indicates the department to which the user who has registered the target file to the client terminal 30 belongs. The department information is acquired with, for example, the employee code of the user being received when the target file is registered in the file server 10 by the client terminal 30.

The confidential designated words corresponding to the management Nos. 000001 to 000005 given in the column (e) in FIG. 3 are words, such as a proper noun and a numerical value, that are weighted by the file analyzing part 11b. In other words, the file analyzing part 11b analyzes the contents of, for example, the confidential designated files corresponding to the management Nos. 000001 to 000005 that have been designated as confidential. The file analyzing part 11b discriminates a word that is high in appearance frequency for each file of the respective departments, weights it, and registers it as a confidential designated word. Here, a plurality of words are registered in the order of higher appearance frequency and higher weighting. The number of registered words is appropriately set and altered by the manager who manages the file server 10.

The confidential designated words corresponding to the management Nos. 000001 to 000005 are referenced when the file analyzing part 11b compares the user file that has been registered by the client terminal 30 with the confidential designated file that is designated as confidential. The file analyzing part 11b references the confidential designated words also in discriminating whether or not the user file that has been registered by the client terminal 30 is a piece of confidential information.

In the column (e) for "confidential designated word" that is given in FIG. 3, the words of "for internal use only" and "secret" corresponding to the management Nos. 000006 and 000007, respectively, are attached to, for example, the header region of a user file. In other words, the file analyzing part 11b searches, for example, the header region in the user file that has been registered. If there is a word of, for example, "for internal use only" or "secret", the file analyzing part 11b determines that there is given a confidential designated word. In this case, the file analyzing part 11b registers it in the pertinent place in the above-mentioned column in the managed information table.

The term of "disclosure" given at the top of the column (f) in FIG. 3 indicates that the confidential designated file or user file that has been registered is disclosed or undisclosed. The file managing part 11c confirms, for example, that the user who has registered a confidential designated file or user file has distributed the confidential designated file or user file to the client terminals 30 of a plurality of other users. Based on this confirmation, the file managing part 11c discriminates whether the confidential designated file or user file is disclosed or undisclosed. In this case, the file managing part 11c gives an indication of "disclosed" in the pertinent place in the above-mentioned column in the managed information table.

The term of "output restriction" given at the top of the column (g) in FIG. 3 indicates that output restriction is applied or not applied to the confidential designated file or user file that has been registered. The term of "confidential designation" at the top of the column (h) in FIG. 3 indicates that confidential designation has been effected or not effected. Here, the confidential designated files corresponding to the management Nos. 000001 to 000005 are designated as confidential. In other words, confidential designation has been "effected" for them. Confidential designation is performed by the manager who manages the file server 10. Further, canceling of confidential designation is also performed by the manager who manages the file server 10. Thereby, leakage prevention of a piece of confidential information that has been designated as confidential is reliably performed. The target files corresponding to the management Nos. 000006 to 000010 are not designated as confidential. In other words, confidential designation is "not effected" for them. These target files are user files.

In FIG. 3, the number of confidential designated files that have been designated as confidential is five. However, the number of them is not limited to five, and may be six or more. In addition, there may be only one confidential designated file that has been designated as confidential. If there is only one confidential designated file that has been designated as confidential, a confidential designated file containing a plurality of confidential designated words is prepared, and such file can be designated as confidential.

As indicated in the column (g) in FIG. 3, the confidential designated files corresponding to the management Nos. 000001 to 000005 are subjected to output restriction. This is kept unchanged until the manager who manages the file server 10 cancels the confidential designation. In addition, if the user who has registered a user file has specified output restriction, an indication of output restriction having been "applied" thereto is given in the column (g) in FIG. 3. The phrase of "the user who has registered a user file has specified output restriction" means that, upon the user registering the target file in the file server 10, the user has selected output restriction being to be applied on the screen for selecting either output restriction being to be applied or not to be applied.

The file analyzing part 11b compares a user file that has been registered with a client terminal 30, with a confidential designated file that has been designated as confidential. The file analyzing part 11b discriminates whether or not the content of the user file that has been registered is similar to the content of the confidential designated file that has been designated as confidential at a rate equal to or higher than a certain value (for example, 80% or higher in similarity). If similar, the file managing part 11c sets the output restriction in the pertinent place in the above-mentioned column in the managed information table at "applied". In addition, if the content of the user file that has been registered has a similarity of, for example, under 80%, the file managing part 11c sets the output restriction in the pertinent place in the above-mentioned column in the managed information table at "not applied".

Even if the output restriction has been set at "applied" once, the file managing part 11c can set the output restriction in the pertinent place in the above-mentioned column in the managed information table at "not applied" if the user file has been disclosed. In addition, when a certain number of days (for example, one year) has passed, starting from the date of registration given in (c) in FIG. 3, the file managing part 11c sets the output restriction in the pertinent place in the above-mentioned column in the managed information table at "not applied". This is performed even if the output restriction has once been set at "applied". However, as with the files of the management Nos. 000002 and 000003, although they are confidential designated files that have been designated as confidential, the "undisclosed" setting may be changed into the "disclosed" one. This occurs because the user file has been distributed to a particular user, for example. However, in this case, the output restriction in the pertinent place in the above-mentioned column in the managed information table is kept set at "applied" until the manager who manages the file server 10 cancels the confidential designation.

Figure 4:
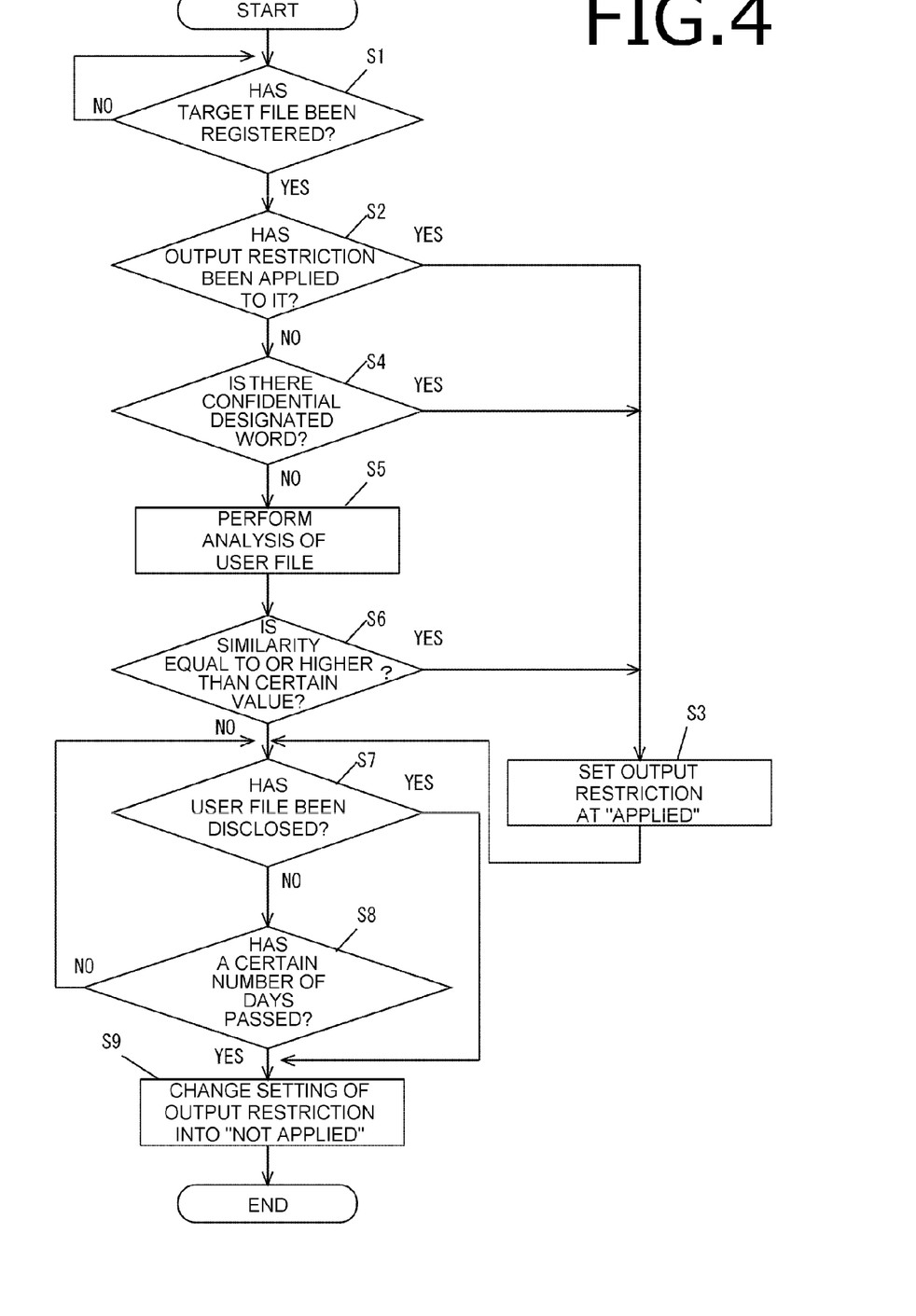
FIG. 4 illustrates the steps of document managing that are performed by the file server in FIG. 1.

Next, with reference to FIG. 4, document management to be performed by the file server 10 will be explained. In the following explanation, the confidential designated files corresponding to the management Nos. 000001 to 000005 that are given in FIG. 3 are those that have been already registered. Based on this, explanation will be made using a case where a file having a management No. 000008 or higher is newly registered. User authentication that is to be made by the file server 10 when the user registers a target file in the file server 10 has already been performed.

First, the control part 11 waits for registration of a target file from the client terminal 30 (Step S1: NO). If a target file from the client terminal 30 is received by the communication management part 11a, the control part 11 determines that the target file has been registered (Step S1: YES).

Next, the file analyzing part 11b analyzes the target file that has been registered, and determines whether or not output restriction has been applied thereto (Step S2). In other words, as described above, if, upon the user registering the target file in the file server 10, the user has selected output restriction being to be applied on the screen for selecting either output restriction being to be applied or not to be applied, the file analyzing part 11b determines that output restriction has been applied thereto (Step S2: YES). In this case, the file analyzing part 11b sets the output restriction in the pertinent place in the column (g) in the managed information table in FIG. 3 at "applied" (Step S3).

Contrarily to this, if, on the screen for selecting either output restriction being to be applied or not to be applied, output restriction being to be applied has not been selected (Step S2: NO), the file analyzing part 11b sets the output restriction in the pertinent place in the column (g) in FIG. 3 in the managed information at "not applied". Next, the file analyzing part 11b determines whether or not there is given a confidential designated word (Step S4). In other words, the file analyzing part 11b searches, for example, the header region in the target file that has been registered. For example, if there is a word of, for example, "for internal use only" or "secret", the file analyzing part 11b determines that there is given a confidential designated word (Step S4: YES). In this case, the file analyzing part 11b sets the output restriction in the pertinent place in the column (g) in FIG. 3 in the managed information table at "applied". The file analyzing part 11b recognizes this target file as a confidential designated file (Step S3).

If the file analyzing part 11b determines that there is given no confidential designated word (Step S4: NO), it recognizes this target file as a user file. The file analyzing part 11b performs analysis of the user file (Step S5). The file analyzing part 11b compares the user file that has been registered, with the confidential designated files corresponding to the management Nos. 000001 to 000005 in FIG. 3. The file analyzing part 11b determines whether the similarity is equal to or higher than a certain value (for example, 80%) (Step S6).

Here, when the file analyzing part 11b is to compare the user file with the confidential designated file, it may compare the user file with all the confidential designated files corresponding to, for example, the management Nos. 000001 to 000005 in FIG. 3. Alternatively, the file analyzing part 11b may compare the user file with the confidential designated file corresponding to the department information given in the column (d) in FIG. 3 for the department to which the user who has registered the user file belongs.

Particularly, by performing comparison with the confidential designated file corresponding to the department information for the department to which the user who has registered the user file belongs, the accuracy of determining whether or not the user file is a piece of confidential information can be enhanced. In other words, upon the user file being compared with the confidential designated file, the confidential designated word in the confidential designated file that is given in the column (e) in FIG. 3 is used. The confidential designated word is a word, such as a proper noun or a numerical value, which is weighted by the file analyzing part 11b. Therefore, by performing comparison with the confidential designated file corresponding to the department information for the department to which the user who has registered the user file belongs, the accuracy of determination can be enhanced. This is because whether or not the user file is a piece of confidential information is determined from the similarity of the content of the user file to the content of the confidential designated file.

Here, if the file analyzing part 11b determines that the similarity is equal to or higher than a certain value (for example, 80%) (Step S6: YES), it sets the output restriction in the pertinent place in the column (g) in the managed information table in FIG. 3 at "applied" (Step S3). Contrarily to this, if the file analyzing part 11b determines that the similarity is not equal to or higher than a certain value (for example, 80%) (Step S6: NO), it sets the output restriction in the above-mentioned pertinent place in the column (g) in the managed information table in FIG. 3 at "not applied".

In this way, the file analyzing part 11b determines whether or not output restriction is to be applied to the user file that has been registered. If the file analyzing part 11b is to apply output restriction, it sets the output restriction in the pertinent place in the column (g) in the managed information table in FIG. 3 at "applied". If the file analyzing part 11b is not to apply output restriction, it sets the output restriction in the pertinent place in the column (g) in the managed information table in FIG. 3 at "not applied".

Here, it is assumed that, on the side of, for example, the MFP 20, the user has acquired a list of user files that are printable. At this time, If any one of the user files listed is subjected to output restriction, the display part 23 displays the content indicating that output restriction is applied thereto. As described above, this is executed by the display managing part 21c based on the piece of output restriction information from the communication managing part 11a. In this case, if another user attempts to print the user files that have been registered, the user file that is subjected to output restriction cannot be printed. Therefore, leakage of confidential information is suppressed.

Next, the file managing part 11c determines whether the user file that has been registered has been disclosed (Step S7). In other words, If, for example, a user file to which output restriction is "applied" in the column (g) in FIG. 3 has been distributed to the client terminals 30 of a plurality of other users, the file managing part 11c determines that the user file has been disclosed (Step S7: YES). In this case, the file managing part 11c sets the output restriction in the pertinent place in the column (g) in the managed information table in FIG. 3 at "not applied".

Contrarily to this, if the file managing part 11c determines that the user file to which output restriction is "applied" is not disclosed (Step S7: NO), it determines whether or not a certain number of days (for example, one year) has passed, starting from the date of registration (Step S8). This determination is performed because even apiece of confidential information that has once been subjected to output restriction often becomes not a piece of confidential information when a certain number of days (for example one year) has passed, starting from the date of registration.

Here, the file managing part 11c is brought into a state of waiting for determination of whether or not a certain number of days (for example one year) has passed, starting from the date of registration (Step S8: NO). If the file managing part 11c determines that a certain number of days (for example one year) has passed, starting from the date of registration (Step S8: YES), it changes the setting of the output restriction in the pertinent place in the column (g) in the managed information table in FIG. 3 into "not applied" (Step S9).

However, for the confidential designated files corresponding to the management Nos. 000001 to 000005 in FIG. 3, the output restriction in the pertinent place in the column (g) in the managed information table in FIG. 3 is set at "applied". As described above, this setting is kept unchanged until the manager who manages the file server 10 cancels the confidential designation.

According to the configuration as stated above, the following advantages can provided. With a typical information processing apparatus, once a user registers a forbidden word, the access authority is set which, if a document to be registered contains that Forbidden word, allows only the user to access it. Therefore, it is possible to prevent leakage of confidential information.

However, with such a method for preventing leakage of confidential information, each user is required to register the Forbidden word. Therefore, the work of registering the Forbidden word that is related to designation of confidential information is made complicated.

In addition, the Forbidden word that is registered is different for each user. Therefore, depending upon the Forbidden word that has been registered, the access authority is not set, and there is the possibility that a piece of confidential information may be leaked. In other words, if a document to be registered has a word that is similar, but incoincident, to the Forbidden word that has been registered, the access authority will not be set.

The present disclosure has been made in view of such a situation, and provides a document managing apparatus and a document managing method that can eliminate the complexity of the work that is related to designation of confidential information, and yet can reliably prevent leakage of confidential information.

Specifically, with the present embodiment, of the target files that have been received by the receiving part (the communication managing part 11a), which receives target files from the client terminal 30, a file that is designated as confidential, having been subjected to output restriction, is managed as a confidential designated file and a file that is not designated as confidential is managed as a user file by the file managing part (the file managing part 11c); the user file and the confidential designated file are compared with each other by the file analyzing part (the file analyzing part 11b); and, if the content of the user file is similar to the content of the confidential designated file at a rate equal to or higher than a certain value (for example, 80%), the user file is subjected to output restriction.

Thereby, application of output restriction to the user file can be automatically performed by making a comparison with a confidential designated file, and yet by making a comparison with a confidential designated file including a number of words that are to be confidential, the accuracy of determination of whether or not the user file is a piece of confidential information can be enhanced. Further, the complexity of work that is related to designation of confidential information can be eliminated, and yet leakage of confidential information can be reliably prevented.

In addition, with the present embodiment, upon the user registering a target file in the file server 10, if the user has selected output restriction being to be applied on the screen for selecting either output restriction being to be applied or not to be applied, or if a confidential designated word is attached to, for example, the header region of a user file, output restriction is applied to the user file. The confidential designated word is, for example, either one or both of "for internal use only" and "secret". Thus, analysis of whether or not it is a piece of confidential information will not be performed by the file analyzing part 11b.

In other words, only for the user file that has not been subjected to output restriction or that does not have either one or both of confidential designated words, the file analyzing part 11b performs analysis of whether or not it is a piece of confidential information. Therefore, wasteful analyzing that would have been performed by the file analyzing part 11b can be omitted. In addition, even for a user file to which, upon the user registering it, output restriction has not been applied, and yet to which any confidential designated word is not attached, analysis of whether or not it is a piece of confidential information is positively performed. Based on this analysis, determination of whether or not output restriction is to be applied can be performed.

Particularly, a file in the form of a memorandum, even if it contains a piece of confidential information, may be registered in the file server 10 as it is, without being subjected to output restriction. Even in such a case, the file is compared with the confidential designated file, and analysis of whether or not it is a piece of confidential information is automatically performed. Therefore, leakage of confidential information can be reliably prevented.

In addition, with the present embodiment, the file analyzing part 11b analyzes the content of a confidential designated file, and weights a word that is high in appearance frequency. Then, using the weighted word, which is high in appearance frequency, the user file is compared with the confidential designated file. Therefore, the accuracy of determination of whether or not it is a piece of confidential information can be enhanced.

In addition, with the present embodiment, when a user file that has been subjected to output restriction (and that is not designated as confidential) is disclosed, or a certain period of time has passed, starting from the date of registration, the file managing part 11c cancels the output restriction to that user file. This cancellation allows another user to freely print or browse the user file, even if it has been subjected to output restriction.

The present embodiment has been explained, using, as an example, the case in which, on the file server 10 side, it is determined whether or not output restriction is to be applied to a user file that has been not subjected to output restriction. However, the present embodiment is not limited to this example. For example, by limiting a specific area for the MFP 20 in which a user file is downloaded from the file server 10 for printing, if a printing request, for example, has come from a mobile terminal that exists in that specific area, the file analyzing part 11b may determine whether or not output restriction is to be applied. Further, the file analyzing part 11b may apply output restriction, if a printing request, for example, has come from a mobile terminal existing outside of that specific area.

In these cases, the control part 21 of the MFP 20 acquires a piece of position information from a position sensor, such as a GPS sensor, that is loaded on the mobile terminal. Then, by determining the position of the mobile terminal from the piece of position information, these modified examples can be implemented. In addition, in these modified examples, the content indicating that output restriction has been applied or an alarm message may be displayed on the mobile terminal.

What is claimed is:

1. A document managing apparatus comprising:
   a receiving circuit that receives target files from a client terminal;
   a file managing circuit that manages, of the received target files, a file, being designated as confidential with output restriction, as a confidential designated file, and a file, being not designated as confidential, as a user file; and
   a file analyzing circuit that compares the user file with the confidential designated file, and upon the content of the user file being similar to the content of the confidential designated file at a rate equal to or higher than a certain value, applies output restriction to the user file, wherein the comparing comprises comparing department information associated with the confidential designated file to department information of a user who registered the user file,
   wherein
   the file managing circuit determines whether the user file has been disclosed,
   the file managing circuit cancels the output restriction to the user file when the file managing circuit determines that the user file has been disclosed,
   following a determination by the file managing circuit that the user file has not been disclosed, the file managing circuit determines whether a specified number of days has passed starting from the date the user file was registered,
   the file managing circuit cancels the output restriction to the user file when the file managing circuit determines that the specified number of days has passed,
   the file managing circuit keeps the output restriction to the confidential designated file when the file managing circuit determines the confidential designated file has been disclosed and when the file managing circuit determines the confidential designated file has not been disclosed, the file managing circuit determines that the user file or the confidential designated file has been disclosed, when the user file or the confidential designated file has been distributed to a client terminal of another user by a user who has registered the confidential designated file or the user file, and
   the file managing circuit keeps the output restriction to the confidential designated file until a manager of the document managing apparatus cancels the confidential designation to the confidential designated file.

2. The document managing apparatus of claim 1, wherein upon a request for the user file being received from a mobile terminal, the document managing apparatus determines whether the location of the mobile terminal is within a specified area and restricts output of the user file when the mobile terminal is not within the specified area.

3. A document managing method, being executed with a computer, for controlling a document managing apparatus, comprising:
   receiving, through a receiving circuit, target files from a client terminal;
   managing, through a file managing circuit, of the received target files, a file, being designated as confidential with output restriction, as a confidential designated file, and a file, being not designated as confidential, as a user file;
   comparing, through a file analyzing circuit, the user file with the confidential designated file, wherein the comparing comprises comparing department information associated with the confidential designated file to department information of a user who registered the user file; and
   upon the content of the user file being similar to the content of the confidential designated file at a rate equal to or higher than a certain value, applying output restriction to the user file through the file analyzing circuit, wherein
- the file managing circuit determines whether the user file has been disclosed,
- the file managing circuit cancels the output restriction to the user file when the file managing circuit determines that the user file has been disclosed,
- following a determination by the file managing circuit that the user file has not been disclosed, the file managing circuit determines whether a specified number of days has passed starting from the date the user file was registered,
- the file managing circuit cancels the output restriction to the user file when the file managing circuit determines that the specified number of days has passed,
- the file managing circuit keeps the output restriction to the confidential designated file when the file managing circuit determines the confidential designated file has been disclosed and when the file managing circuit determines the confidential designated file has not been disclosed,
- the file managing circuit determines that the user file or the confidential designated file has been disclosed when the user file or the confidential designated file has been distributed to a client terminal of another user by a user who has registered the confidential designated file or the user file, and
- the file managing circuit keeps the output restriction to the confidential designated file until a manager of the document managing apparatus cancels the confidential designation to the confidential designated file.

4. The document managing method of claim 3, further comprising, upon a request for the user file being received from a mobile terminal, determining whether the location of the mobile terminal is within a specified area, and restricting output of the user file when the mobile terminal is not within the specified area.

5. A non-transitory computer-readable recording medium that causes a computer to act as a file server comprising:
- a receiving circuit that receives target files from a client terminal;
- a file managing circuit that manages, of the received target files, a file, being designated as confidential with output restriction, as a confidential designated file, and a file, being not designated as confidential, as a user file; and
- a file analyzing circuit that compares the user file with the confidential designated file, and upon the content of the user file being similar to the content of the confidential designated file at a rate equal to or higher than a certain value, applies output restriction to the user file, wherein the comparing comprises comparing department information associated with the confidential designated file to department information of a user who registered the user file, wherein
- the file managing circuit determines whether the user file has been disclosed,
- the file managing circuit cancels the output restriction to the user file when the file managing circuit determines that the user file has been disclosed,
- following a determination by the file managing circuit that the user file has not been disclosed, the file managing circuit determines whether a specified number of days has passed starting from the date the user file was registered,
- the file managing circuit cancels the output restriction to the user file when the file managing circuit determines that the specified number of days has passed,
- the file managing circuit keeps the output restriction to the confidential designated file when the file managing circuit determines the confidential designated file has been disclosed and when the file managing circuit determines the confidential designated file has not been disclosed, the file managing circuit determines that the user file or the confidential designated file has been disclosed when the user file or the confidential designated file has been distributed to a client terminal of another user by a user who has registered the confidential designated file or the user file, and
- the file managing circuit keeps the output restriction to the confidential designated file until a manager of the document managing apparatus cancels the confidential designation to the confidential designated file.

6. The non-transitory computer-readable recording medium of claim 5, wherein the non-transitory computer-readable recording medium causes the computer to, upon a request for the user file being received from a mobile terminal, determine whether the location of the mobile terminal is within a specified area, and restrict output of the user file when the mobile terminal is not within the specified area.

* * * * *